UNITED STATES PATENT OFFICE.

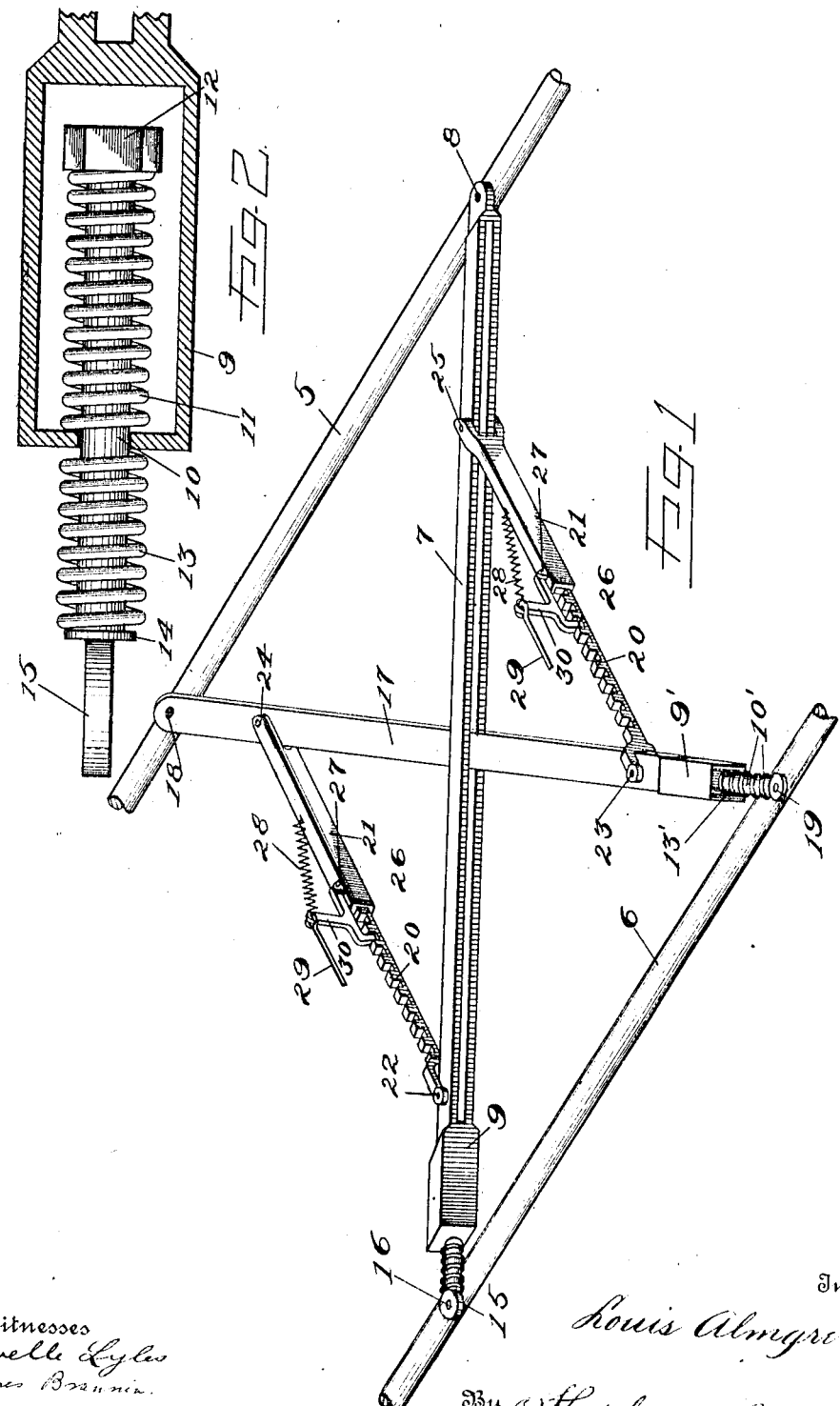

LOUIS ALMGREN, OF SAN DIEGO, CALIFORNIA.

EQUALIZING TRAILING COUPLING DEVICE.

1,020,393.  Specification of Letters Patent.  Patented Mar. 19, 1912.

Application filed October 16, 1911.  Serial No. 654,894.

*To all whom it may concern:*

Be it known that I, LOUIS ALMGREN, a citizen of the United States, residing at San Diego, in the county of San Diego and State of California, have invented certain new and useful Improvements in Equalizing Trailing Coupling Devices, of which the following is a specification.

This invention relates to an equalizing trailing coupling device the object of which is to provide an improved structure adapted to be used in drawing a fire engine by means of an auto-truck, though it may be used to draw any kind of vehicle by means of any other vehicle.

Further objects and advantages of the invention will be set forth in the detailed description which now follows.

In the accompanying drawing, Figure 1 is a perspective view of a device constructed in accordance with the invention, and Fig. 2 is a detailed sectional view through the head of one of the coupling rods hereinafter described.

Like numerals designate corresponding parts in both of the figures of the drawing.

Referring to the drawing, the numeral 5 designates the rear axle of an automobile truck, and 6 designates the front axle frame or bed of a fire engine or other vehicle intended to be drawn by means of said truck. A double bar 7 has one of its ends attached to the axle 5 at 8 and at its opposite end is provided with a hollow head 9. A plunger rod 10 is slidably disposed in the hollow head 9 and a spring 11 bears between one end of the hollow head 9 and a head 12 of the rod 10. A second spring 13 bears between the outer face of the end of the head 9 and a collar 14 carried by the plunger rod. The plunger rod is provided with the eyelet 15, which is pivoted at 16 to the axle 6. The bar 17 is pivoted at 18 to the axle 5, and at its opposite end is provided with a head 9' in which plunger rod 10' is disposed, these parts, 9' and 10' corresponding exactly with the parts 9 and 10 (see Fig. 2), and the arrangement of springs is the same, only the outer spring being shown in the perspective view, where it is designated 13'. The plunger rod 10' is pivotally connected at 19 with the axle 6. A pair of bars, each of which comprises a toothed rod portion 20 and a sleeve portion 21 extend between the bars 7 and 17. The toothed bars are pivoted at 22 and 23 to the bars 7 and 17 respectively, while the sleeves 21 are pivotally connected at 24 and 25 to the bars 17 and 7 respectively. Latches 26 are pivotally mounted in the ears 27 of the sleeves 21 and are adapted to engage the teeth of the bars 20 when they are pulled down against the tension of the springs 28. For the purpose of pulling these latches down to engaged position against the tension of these springs 28, rods 29 are connected to the upward extension 30 of the latches. When the auto truck is running ahead the rods 29 are released, whereupon the springs 28 hold the latches out of engagement with the teeth, thereby permitting free movement of the parts 17 and 7, causing the following vehicle to trail behind the auto truck, accommodating itself to curves, but at the same time being held against overrunning the power vehicle. When it is desired to back the fire engine the rods 29 are actuated to move the latch members 26 into engagement with the teeth of the bars 20, whereupon reverse movement of the automobile truck will back the engine on any wheel alinement desired. While in the present instance the rods 29 have been illustrated as running toward the fire engine to be operated therefrom, it is apparent that they may extend in the opposite direction to be operated from the automobile if desired. It will be apparent that the springs 11 act as shock absorbers when traveling ahead and that the springs 13 act as shock absorbers when backing.

From the foregoing description it will be seen that simple and efficient means are herein provided for accomplishing the purposes of the invention.

While all the elements shown and described are well adapted to serve the purposes for which they are intended, it is to be understood that the invention is not limited to the precise construction set forth, but includes within its purview such changes as may be made within the scope of the appended claims.

Having described my invention what I claim is:

1. In a device of the character described the combination with the front and rear axles of separate vehicles of a pair of crossed bars pivotally connected at their ends to said axles, and locking means for locking said bars against movement with relation to each other.

2. In a device of the character described the combination with the front and rear axles of separate vehicles of a pair of crossed bars pivotally connected at their ends to said axles, telescopic members extending between said bars and pivotally connected thereto, and latch members for locking the pairs of the telescopic members against movement with relation to each other.

3. In a device of the character described the combination with the front and rear axles of separate vehicles of a pair of crossed bars pivotally connected at their ends to said axles, telescopic members extending between said bars and pivotally connected thereto, and latch members for locking the pairs of the telescopic members against movement with relation to each other, said bars having spring buffers disposed within their length.

4. In a device of the character described the combination with the front and rear axles of separate vehicles of a pair of crossed bars pivotally connected at their ends to said axles, telescopic members extending between said bars and pivotally connected thereto, and latch members for locking the pairs of the telescopic members against movement with relation to each other, said bars having spring buffers disposed within their length, each acting in both directions.

5. In a device of the character described the combination with the front and rear axles of separate vehicles of a double bar having a hollow head at one end, a plunger rod extending from said hollow head, and springs for resisting the movement of the plunger rod with relation to said hollow head, means for pivoting the double bar at one of its ends to one of said axles, means for pivoting the plunger rod at the other end of the double bar to the other of said axles, a single bar passing obliquely through the double bar and being connected at one of its ends to one of said axles, a hollow head at the other end of the single bar, a plunger rod extending from the hollow head, a spring for resisting the movement of said second plunger member in said hollow head, means for pivoting the said second plunger rod to one of the said axles, telescopic bars extending between said bars and latch members for locking the portions of the telescopic bars against movement with relation to each other.

6. In a device of the character described the combination with front and rear axles of separate vehicles of a double bar having a hollow head at one end, a plunger rod extending from said hollow head, and springs for resisting the movement of the plunger rod with relation to said hollow head, means for pivoting the double bar at one of its ends to one of said axles, means for pivoting the plunger rod at the other end of the double bar to the other of said axles, a single bar passing obliquely through the double bar and being connected at one of its ends to one of said axles, a hollow head at the other end of the single bar, a plunger rod extending from the hollow head, a spring for resisting the movement of said second plunger member in said hollow head, means for pivoting the said second plunger rod to one of the said axles, telescopic bars extending between said bars, and latch members for locking the portions of the telescopic bars against movement with relation to each other, said telescopic bars comprising toothed portions and sleeve portions in which said toothed portions slide, said latch members being carried by the sleeve portions and being adapted to engage with said toothed portion.

In testimony whereof I affix my signature in presence of two witnesses.

LOUIS ALMGREN.

Witnesses:
 J. C. HIZAR,
 G. U. FRY.